United States Patent
Takahashi et al.

(10) Patent No.: US 8,749,152 B2
(45) Date of Patent: Jun. 10, 2014

(54) SWITCHING POWER SUPPLY AND LUMINAIRE

(75) Inventors: Yuji Takahashi, Kanagawa-ken (JP); Noriyuki Kitamura, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 161 days.

(21) Appl. No.: 13/425,034

(22) Filed: Mar. 20, 2012

(65) Prior Publication Data

US 2013/0002160 A1 Jan. 3, 2013

(30) Foreign Application Priority Data

Jun. 29, 2011 (JP) .................................. 2011-144144

(51) Int. Cl.
*H05B 37/02* (2006.01)
*G05F 5/00* (2006.01)

(52) U.S. Cl.
USPC ....... 315/200 R; 315/283; 315/307; 323/290; 323/301; 323/345

(58) Field of Classification Search
USPC .......... 315/200 R, 219, 239, 241 R, 242, 283, 315/307; 323/282, 351, 328, 290, 301, 345
See application file for complete search history.

(56) References Cited

U.S. PATENT DOCUMENTS

| 7,825,435 | B2 | 11/2010 | Machida et al. |
| 2008/0191216 | A1 | 8/2008 | Machida et al. |
| 2009/0108769 | A1* | 4/2009 | Ishikita et al. ................. 315/291 |
| 2011/0316494 | A1* | 12/2011 | Kitamura et al. ............. 323/229 |

FOREIGN PATENT DOCUMENTS

JP 2004-119078 4/2004

OTHER PUBLICATIONS

First Office Action issued in corresponding Chinese Patent Application No. 201210077691.6 mailed Mar. 27, 2014.

* cited by examiner

*Primary Examiner* — Daniel D Chang
(74) *Attorney, Agent, or Firm* — Banner & Witcoff, Ltd.

(57) ABSTRACT

A switching power supply includes a first switching element, a rectifying element, a first inductor and a second inductor. The first switching element supplies a power supply voltage to the first inductor and allows a current to flow when the first switching element is on. The rectifying element is connected in series to the first switching element, and allows a current of the first inductor to flow when the first switching element is turned off. The second inductor is electromagnetically coupled to the first inductor, a potential to turn on the first switching element is induced when the current of the first inductor increases, and a potential to turn off the first switching element is induced when the current of the first inductor decreases. The induced potential is supplied to a control terminal of the first switching element. The rectifying element includes a diode and a second switching element.

20 Claims, 1 Drawing Sheet

SWITCHING POWER SUPPLY AND LUMINAIRE

CROSS-REFERENCE TO RELATED APPLICATION

This application is based upon and claims the benefit of priority from the prior Japanese Patent Application No. 2011-144144, filed on Jun. 29, 2011; the entire contents of which are incorporated herein by reference.

FIELD

Embodiments described herein relate generally to a switching power supply and a luminaire.

BACKGROUND

In recent years, in an illumination light source of a luminaire, an incandescent lamp or a fluorescent lamp is being replaced with an energy-saving and long-lived light source, for example, a light-emitting diode (LED). Besides, a new illumination light source, for example, an electro-luminescence (EL), an organic light-emitting diode (OLED) or the like is also developed. Since the light output of the illumination light source depends on the value of flowing current, when illumination is lighted, a power supply circuit for supplying a constant current is required. Besides, in order to adjust an inputted power supply voltage to a rated voltage of the illumination light source such as the LED, the voltage is required to be converted. A switching power supply such as a chopper type DC-DC converter is known as a power supply having high efficiency and suitable for power saving and miniaturization. Besides, an LED lighting device using the switching power supply is proposed (see, for example, patent document 1).

[Patent document 1] JP A. 2004-119078

However, in the chopper type DC-DC converter, since current, flows through a diode having a large voltage drop when a switching element is off, there is a problem that a power loss is large.

Exemplary embodiments described herein provide a switching power supply having a small power loss and a luminaire.

DETAILED DESCRIPTION

Figure 1:
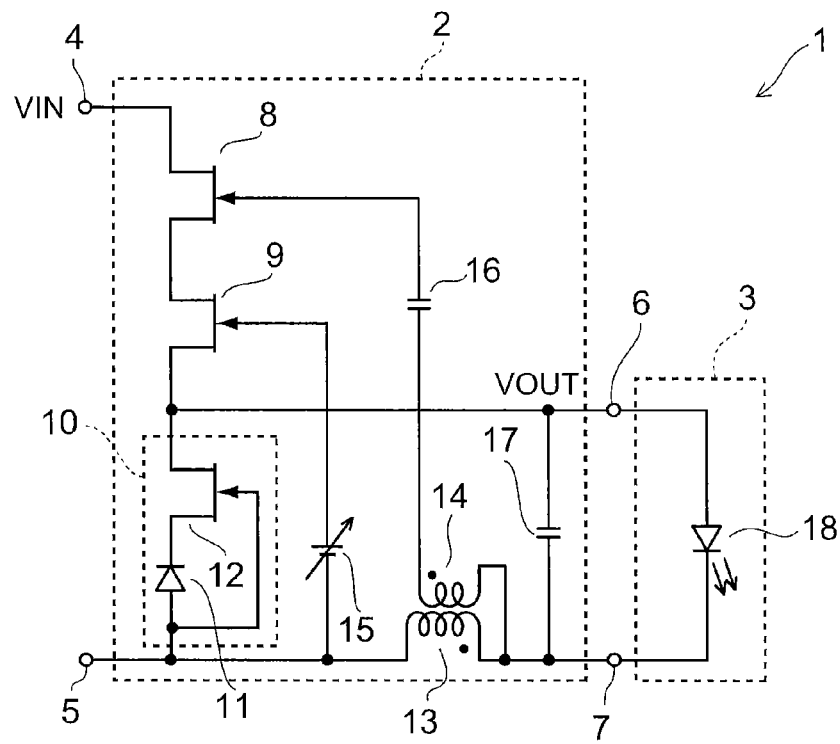
FIG. 1 is a circuit view exemplifying a luminaire including a switching power supply of a first embodiment.

In general, according to one embodiment, a switching power supply includes a first switching element, a rectifying element, a first inductor and a second inductor. The first switching element supplies a power supply voltage to the first inductor and allows a current to flow when the first switching element is on. The rectifying element is connected to the first switching element, and allows a current of the first inductor to flow when the first switching element is turned off. The second inductor is electromagnetic ally coupled to the first inductor, a potential to turn on the first switching element is induced when the current of the first inductor increases, and a potential to turn off the first switching element is induced when the current of the first inductor decreases. The induced potential is supplied to a control terminal of the first switching element. The rectifying element includes a diode having a withstand voltage lower than that of the first switching element, and a second switching element, that is connected in series to a cathode of the diode and includes a control terminal connected to an anode of the diode.

According to another embodiment, a luminaire includes a switching power supply and an illumination load connected as a load circuit of the switching power supply. The switching power supply includes a first switching element, a rectifying element, a first inductor and a second inductor. The first switching element supplies a power supply voltage to the first inductor and allows a current to flow when the first switching element is on. The rectifying element is connected to the first switching element, and allows a current of the first inductor to flow when the first switching element is turned off. The second inductor is electromagnetically coupled to the first inductor, a potential to turn on the first switching element is induced when the current of the first inductor increases, and a potential to turn off the first switching element is induced when the current of the first inductor decreases. The induced potential is supplied to a control terminal of the first switching element. The rectifying element includes a diode having a withstand voltage lower than that of the first switching element, and a second switching element that is connected in series to a cathode of the diode and includes a control terminal connected to an anode of the diode.

Hereinafter, embodiments will be described in detail with reference to the drawings. Incidentally, in the specification of the respective drawings, the same component as one already described in a previous drawing is denoted by the same reference numeral and the detailed description thereof is suitably omitted.

First, a first embodiment will be described.

FIG. 1 is a circuit view exemplifying a luminaire including a switching power supply of the first embodiment.

As shown in FIG. 1, a luminaire 1 includes a switching power supply 2 to reduce an input DC power supply voltage VIN to a voltage VOUT, and an illumination load 3 as a load circuit of the switching power supply 2. The illumination load 3 includes an illumination light source 18. The illumination light source 18 is composed of, for example, an LED, and is lighted by being; supplied with the voltage VOUT from the switching power supply 2.

In the switching power supply 2, a first switching element 8 and a constant current element 9 are connected in series between a high potential power supply terminal 4 and a high potential output terminal 6. That is, a drain of the first switching element 8 is connected to the high potential power supply terminal 4, a source of the first switching element 8 is connected to a drain of the constant current element 9, and a source of the constant current element 9 is connected to the high potential output terminal 6. Each of the first switching element 8 and the constant current element 9 is, for example, a field effect transistor (FET) or a high electron mobility transistor (HEMT), and is a normally-on element.

A rectifying element 10 is connected between the high potential output terminal 6 and a low potential power supply terminal 5, in which a direction directed from the low potential power supply terminal 5 to the high potential output terminal 6 is a forward direction. That i s, the rectifying element 10 is connected in series to the first switching element 8 through the constant current element 9. The rectifying element 10 includes a diode 11 and a second switching element 12. A drain of the second switching element 12 is connected to the high potential output terminal 6, a source is connected to a cathode of the diode 11, and a gate (control terminal of the second switching element) is connected to an anode of the diode 11. Besides, the anode of the diode 11 is connected to the low potential power supply terminal 5. The diode 11 is, for example, a Schottky barrier diode (SED) having a withstand voltage lower than that of the first switching element 8. The second switching element 12 has the same withstand voltage as that of the first switching element 8, and is, for example, the FIT or the HEMT and is the normally-on element.

Further, in the switching power supply 2, a first inductor 13 is connected between the low potential power supply terminal 5 and a low potential output terminal 7. The first inductor 13 is connected in series to the first switching element 8 and the constant. current element 9 through the illumination load 3. A second inductor 14 is magnetically coupled to the first inductor 13, one end thereof is connected to the low potential output terminal 7, and the other end is connected to a gate as a control terminal of the first switching element 8 through a capacitor 16.

A voltage generation circuit 15 is connected between a gate as a control terminal of the constant current element 9 and the low potential power supply terminal 5. The voltage generation circuit 15 is configured so that a generated voltage value can be adjusted. Further, a smoothing capacitor 17 is connected between the high potential output terminal 6 and the low potential output terminal 7.

Next, the operation of the switching power supply 2 will be described.

(1) When the power supply voltage VIN is supplied between the high potential power supply terminal. 4 and the low potential power supply terminal 5, since the first switching element 8 and the constant current element 9 are the normally-on elements, both are on. A current flows through a path of the high potential power supply terminal 4, the first switching element 8, the constant current element 9, the smoothing capacitor 17, the first inductor 13 and the low potential power supply terminal 5, and the smoothing capacitor 17 is charged. A voltage at both ends of the smoothing capacitor 17, that is, a voltage between the high potential output terminal 6 and the low potential output terminal 7 is supplied as the output voltage VOUT of the switching power supply 2 to the illumination light source 18 of the illumination load 3.

(2) Since the first switching element 8 and the constant current element 9 are on, the power supply voltage VIN is substantially applied to both ends of the rectifying element 10. The diode 11 is reversely biased, and current does not flow through the rectifying element 10. At this time, the voltage applied to both the ends of the rectifying element 10 is divided by the diode 11 and the second switching element 12. However, the diode 11 has only to bear a gate-source voltage of the switching device 12, and the second switching element 12 can ensure the withstand voltage.

(3) When the output voltage VOUT reaches a specified voltage, current flows through the illumination light source 18, and the illumination light source 18 is lighted. At this time, the current flows through a path of the high potential power supply terminal 4, the first switching element 8, the constant current element 9, the smoothing capacitor 17 and the illumination light source 18, the first inductor 13, and the low potential power supply terminal 5. For example, when the illumination light source 18 is the LED, the specified voltage is a forward voltage of the LED and is determined according to the illumination light source 18.

(4) Since the power supply voltage VIP is supplied to the first inductor 13 through the first switching element 8 and the constant current element 9, current flowing through the first inductor 13 increases. Since the second inductor 14 is magnetically coupled to the first inductor 13, an electromotive force with such a polarity that the capacitor 16 side is at a high potential is induced in the second inductor 14. Thus, a positive potential with respect to the source is supplied to the gate of the first switching element 8 through the capacitor 16, and the first switching element 8 keeps an ON state.

(5) When the current flowing through the constant current element 9 composed of the FET exceeds a specified current value, a drain-source voltage of the constant current element 9 abruptly rises. Thus, the gate-source voltage of the first switching element 8 becomes lower than a threshold voltage, and the first switching element 8 is turned off Incidentally, the specified current value is a saturation current value of the constant current element 9, which is set by the voltage value generated by the voltage generation circuit 15.

(6) The first inductor 13 keeps the current flowing through the path of the rectifying element 10, the smoothing capacitor 17 and the illumination load 3, and the first inductor 13. Thus, the illumination light source 18 keeps lighting on. Since the first inductor 13 releases electromagnetic energy, the current of the first inductor 13 decreases. Thus, an electromotive force with such a polarity that the capacitor 16 side is at a low potential is induced in the second inductor 14. A negative potential with respect to the source is supplied to the gate of the first switching element 8 through the capacitor 16, and the first switching element 8 keeps an OFF state.

(7) When the electromagnetic energy stored in the first inductor 13 becomes zero, the current flowing through the first inductor 13 becomes zero. At this time, the output voltage VOUT decreases to the specified voltage. The direction of the electromotive force inducted in the second inductor 14 is again reversed, and the electromotive force in which the capacitor 16 side is at the high Potential is induced. By this, the potential higher than that at the source is supplied to the gate of the first switching element 8, and the first switching element 8 is turned on. By this, a return is made to the state of the above (2).

After this, the above (2) to (7) are repeated. By this, the switching of ON and OFF of the first switching element 8 is automatically repeated, and the output voltage VOUT obtained by reducing the power supply voltage VIN is supplied to the illumination light source 18. Besides, the current supplied to the illumination light source 18 becomes a constant current in which an upper limit, value is restricted by the constant current element 9. Thus, the illumination light source 18 can be stably lighted.

Next, the effects of the embodiment will be described.

In this embodiment, in the rectifying element 10, the second switching element 12 ensures the withstand voltage, and an element having a lower withstand voltage than that of the first switching element 8 is used as the diode 11. Accordingly, the forward voltage of the rectifying element 10 is reduced and conduction loss can be reduced.

For example, if only a Si PN junction diode having a short reverse recovery time is used instead of the rectifying element 10, an element having a high withstand voltage is required to be used as the diode. For example, a forward voltage of a high speed diode having a withstand voltage of 600 V is, for example, about 1.2V. Accordingly, it an average, current of, for example, 1 A flows, conduction loss of the diode is 1.2 W. Besides, in the case of the Si PN junction diode, loss due to reverse recovery at turn-off also occurs. For example, when a diode having a reverse recovery time trr=100 ns is turned off with a rate of change of a current i, di/dt=50 A/μs, if the diode is operated at a frequency f=1 MHz, the loss due to the reverse recovery is about 1 W.

However, in the rectifying element 10, the diode 11 is the element having the lower withstand voltage, than that of the first switching element 8, and has only to ensure the withstand voltage of the gate-source voltage of the second switching element 12. For example, in the case of a SBD having a withstand voltage of 20 V, the forward voltage is about 0.4 V. Besides, if the second switching element 12 is a normally-on GaN FET having a withstand voltage of 600 V, an on-resistance is about 0.1 Ω.

Accordingly, similarly to the above, if an average current of, for example, 1 A flows, the conduction loss of the diode 11 is 0.4 W, and the conduction loss of the second switching element. 12 is 0.1 W. Thus, the conduction loss of the rectifying element 10 is 0.5 W. Besides, since the SBD has no reverse recovery in principle, the loss due to the reverse recovery is zero, and switching loss at turn-off of the rectifying element 10 is also zero.

As stated above, the conduction loss of the rectifying element 10 can be reduced, and further, the diode 11 of the SBD has no switching loss at turn-off. Thus, as compared with the case where only a diode having a high withstand voltage is used, power loss due to the rectifying element 10 can be reduced. Accordingly, in the switching power supply 2, the power loss when the first switching element 8 is turned off can be reduced.

The switching power supply 2 is a voltage reducing switching power supply to output the output voltage VOUT obtained by reducing the power supply voltage VIE. When a period in which the first switching element 8 is on is Ton, and a period in which the first switching element is off is Toff, a ratio (duty ratio) α of the period Ton to one cycle T=Ton+Toff is α=Ton/T=VOUT/VIN.

Accordingly, as a voltage reaction ratio VIN/Vout becomes high, the duty ratio α becomes small, and the period in which the first switching element is off becomes long. For example, if the power supply voltage VIN of 100 V to 240 V obtained by rectifying a commercial power supply is supplied between the high potential power supply terminal 4 and the low potential power supply terminal 5, and as the illumination light source 18, the LED with a forward voltage of 50 V or less is lighted, the duty ratio α becomes 0.5 or less. The period Toff in which the first switching element 8 is off is longer than the period Ton in which the first switching element is on, and the effect of reducing the power loss due to the forward voltage of the rectifying element 10 is high.

Further, when the HEMT is used as the element of each of the first switching element 8, the constant current element 9 and the second switching element 12, a high frequency operation becomes possible. For example, an operation at an order of Mega Hertz becomes possible. Especially, when a GaN HEMT is used, a higher frequency operation is possible. Further, since an element withstand voltage is high, if the withstand voltage is made the same, a chip size can be reduced.

Figure 2:
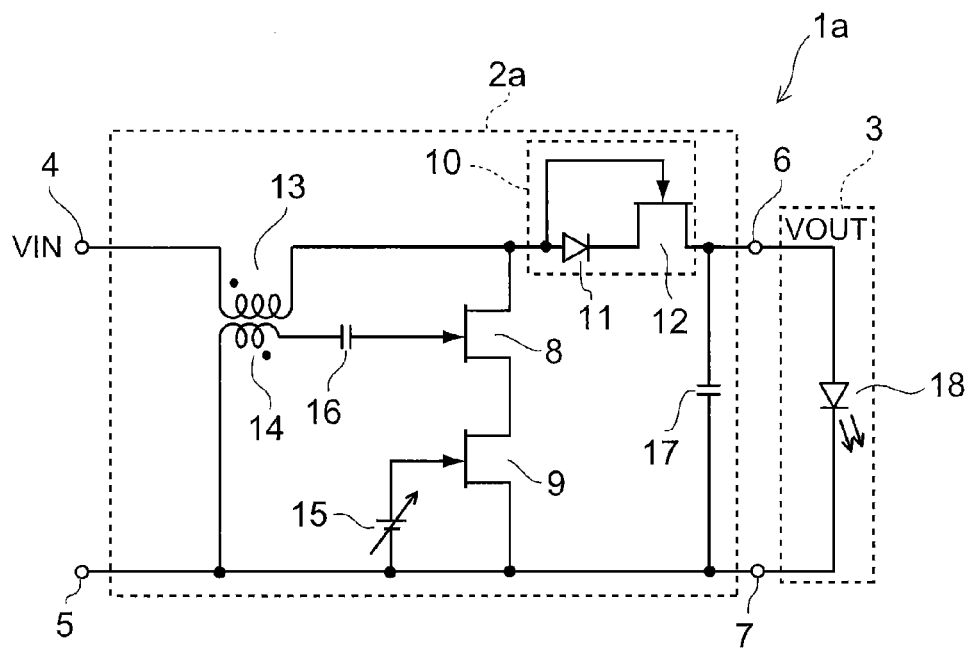
FIG. 2 is a circuit view exemplifying a luminaire including a switching power supply of a second embodiment.

FIG. 2 is a circuit view exemplifying a luminaire including a power supply circuit of a second embodiment.

As shown in FIG. 2, a luminaire 1a includes a switching power supply 2a to raise an input. DC power supply voltage VIN to a voltage VOUT, and an illumination load 3 as a load circuit of the switching power supply 2a. The illumination load 3 is same as that of FIG. 1, and an illumination light source 18 is supplied with the voltage VOUT from the switching power supply 2a and is lighted. Incidentally, in FIG. 2, the same component as that of FIG. 1 is denoted by the same reference numeral.

In the switching power supply 2a, a first switching element 8 and a constant current element 9 are connected in series between a high potential power supply terminal 4 and a low potential power supply terminal 5 through a first inductor 13. That is, a drain of the first switching element 8 is connected to the high potential power supply terminal 4 through the first inductor 13, a source of the first switching element 8 is connected to a drain of the constant current element 9, and a source of the constant current element 9 is connected to the low potential power supply terminal 5. Each of the first switching element 8 and the constant current element 9 is the same as that of FIG. 1, and is, for example, a field effect transistor (FET) or a high electron nobility transistor (HEMT) and is a normally-on element.

A rectifying element 10 is connected between the first inductor 13 and the first switching element 8 and a high potential output terminal 6, in which a direction directed from the first switching element 8 to the high potential output terminal 6 is a forward direction. That is, the rectifying element 10 is connected in series to the first switching element 8. The rectifying element 10 is the same as that of FIG. 1, and includes a diode 11 and a second switching element 12.

Further, in the switching power supply 2a, a second inductor 14 is magnetically coupled to the first inductor 13, one end thereof is connected to the low potential power supply terminal 5, and the other end is connected to a gate as a control terminal, of the first switching element 8 through a capacitor 16.

A voltage generation circuit 15 is connected between a gate as a control terminal of the constant current element 9 and the low potential power supply terminal 5. The voltage generation circuit 15 is the same as that of FIG. 1, and is configured so that a generated voltage value can be adjusted. Further, a smoothing capacitor 17 is connected between the high potential output terminal 6 and a low potential output terminal 7.

Next, the operation of the switching power supply 2a will be described.

(1a) When the power supply voltage VIN is supplied between the high potential power supply terminal 4 and the low potential power supply terminal 5, since the first switching element 8 and the constant current element 9 are the normally-on elements, both are on. A current flows through a path of the high potential power supply terminal 4, the first inductor 13, the first switching element 8, the constant current element 9 and the low potential power supply terminal 5.

(2a) Since the first switching element 8 and the constant current element 9 are on, the output voltage VOUT is substantially applied to both ends of the rectifying element 10. The diode 11 is reversely biased, and current does not flow through the rectifying element 10. At this time, the voltage applied to both the ends of the rectifying element 10 is divided by the diode 11 and the second switching element 12. However, the diode 11 has only to bear a gate-source voltage of the switching device 12, and the second switching element 12 can ensure a withstand voltage.

(3a) Since the power supply voltage PIN is supplied to the first inductor 13 through the first switching element 8 and the constant current element 9, the current flowing through the first inductor 13 increases. Since the second inductor 14 is magnetically coupled to the first inductor 13, an electromotive force with such a polarity that the capacitor 16 side is at a high potential is induced in the second inductor 14. Thus, a positive potential with respect to the source is supplied to the gate of the first switching element 8 through the capacitor 16, and the first switching element 8 keeps an ON state.

(4a) When the current flowing through the constant current element 9 composed of the FET exceeds a specified current value, a drain-source voltage of the constant current element 9 abruptly rises. Thus, the gate-source voltage of the first switching element 8 becomes lower than a threshold voltage, and the first switching element 8 is turned off. Incidentally, the specified current value is a saturation current value of the constant current element 9, which is set by the voltage value generated by the voltage generation circuit 15.

(5a) The first inductor 13 keeps the current flowing through the path of the rectifying element 10, the smoothing capacitor 17 and the low potential power supply terminal 5, and the smoothing capacitor 17 is charged. The voltage at both ends of the smoothing capacitor 17, that is, the voltage between the high potential output terminal 6 and the low potential output terminal 7 is supplied as the output voltage VOUT of the switching power supply 2a to the illumination light source 18 of the illumination load 3.

(6a) When the output voltage VOUT reaches a specified voltage, the current flows through the illumination light source 18, and the illumination light source 18 is lighted. At this time, the current flows through a path of the high potential power supply terminal 4, the first inductor 13, the rectifying element 10, the smoothing capacitor 17 and the illumination light source 18, and the low potential power supply terminal 5. For example, when the illumination light source 13 is the LED, the specified voltage is a forward voltage of the LED and is determined according to the illumination light source 18.

(7a) The first inductor 13 keeps the current flowing through the path of the rectifying element 10, the smoothing capacitor 17 and the illumination light, source 18, and the low potential power supply terminal 5. Thus, the illumination light source 18 keeps lighting on. Since the first inductor 13 releases electromagnetic energy, the current of the first inductor 13 decreases. Thus, an electromotive force with such a polarity that the capacitor 16 side is at a low potential is induced in the second inductor 14. A potential negative with respect to the source is supplied to the gate of the first switching element 8 through the capacitor 16, and the first switching element 8 keeps an off state.

(8a) When the electromagnetic energy stored in the first inductor 13 becomes zero, the current flowing through the first inductor 13 becomes zero. At this time, the output voltage VOUT becomes a voltage value almost equal to the power supply voltage VIN. When the output voltage VOUT becomes lower than the specified voltage, the current flowing through the first inductor 13 becomes almost zero.

The direction of the electromotive force induced in the second inductor 14 is again inverted, and the electromotive force in which the capacitor 16 side is at the high potential is generated. By this, a potential higher than that of the source is applied to the gate of the first switching element 8, and the first switching element 8 is turned on. By this, a return is made to the state of the above (1a).

After this, the above (1a) to (8a) are repeated. By this, the switching of ON and OFF of the first switching element 8 is automatically repeated, and the output voltage VOUT obtained by raising the power supply voltage VIP is supplied to the illumination light source 18. Incidentally, the current supplied to the illumination light source 18 becomes a constant current in which an upper limit value is rested by the constant current element 9. Thus, the illumination light source 18 can be stably lighted.

Next, the effects of the second embodiment will be described.

Also in the second embodiment, when the first switching element 8 is turned, off, the current of the first inductor 13 flows through the rectifying element 10. Accordingly, the effects of the second embodiment are the same as the effects of the first embodiment. However, the switching power supply 2a is a voltage raising switching power supply to output the output voltage VOUT obtained by raising the power supply voltage VIN. Accordingly, a duty ratio $\alpha$ is $\alpha = \text{Ton}/T = 1 - \text{VIN}/\text{VOUT}$.

As a voltage raising ratio VOUT/VIN becomes low, the duty ratio $\alpha$ becomes small, and a period in.1Which the first switching element 8 is off becomes long. For example, when the power supply voltage VIN of a primary battery or a secondary battery is supplied between the high potential power supply terminal 4 and the low potential power supply terminal 5, and the LED as the illumination light source 18 is lighted, if the voltage raising ratio is 2 or less, the duty ratio $\alpha$ becomes 0.5 or less. A period Toff in which the first switching element 8 is off is longer than a period Ton in which the first switching element is on, and the effect of reducing the power loss due to the forward voltage of the rectifying element 10 is high.

The effects of the second embodiment other than the above are same as those of the first embodiment.

The embodiments are described with reference to the specific examples. However, the invention is not limited to those, and various modifications can be carried out For example, in the first and the second embodiment, the examples are described in which the first switching element 8 and the constant current element 9 are the normally-on elements. However, the invention is not limited to this, and a normally-off element may be used. In this case, a start-up circuit is required which starts the switching power supply 2, 2a when the supply of the power supply voltage VIN is started Besides, the structure of the switching power supply is not limited to one shown in FIG. 1 and FIG. 2. For example, the first inductor 13 has only to be located in the path of the high potential power supply terminal 4, the first switching element 8, the constant current element 9, the smoothing capacitor 17 and the low potential power supply terminal 5, or may be connected between a connection point between the constant current element 9 and the rectifying element 10 and the high potential output terminal 6.

Besides, the first switching element 8, the constant current element 9 and the second switching element 12 are not limited to the GaN HEMT. For example, a semiconductor element may be adopted which is formed by using a semiconductor (wide band gap semiconductor) having a wide band gap, such as silicon carbide (SiC), gallium nitride (GaN) or diamond, as a semiconductor substrate. Here, the wide band gap semiconductor is a semiconductor having a band gap wider than gallium arsenide (GaAs) having a band gap of about 1.4 eV. The wide band gap semiconductor is, for example, a semiconductor having a band gap of 1.5 eV or more, gallium phosphide (GaP, the band gap is about 2.3 eV), gallium nitride (GaP, the band gap is about 3.4 eV), diamond (C, the band gap is about 5.27 eV), aluminum nitride (AlN, the band gap is about 5.9 eV), silicon carbide (SiC) or the like. Since parasitic capacitance of the wide band gap semiconductor element is small and high speed operation is possible, the switching power supply can be miniaturized, and the switching loss can be reduced.

Further, the illumination light source 18 is not limited to the LED, and may be an EL or an OLED. Plural illumination light sources 18 may be connected in series or in parallel to each other in the illumination load 3.

Besides, in the first and the second embodiment, although the case where the illumination light source is used as the load of the switching power supply is exemplified, the exemplified switching power supply can be used not only for the illumination light source but also for any load as long as the load is driven by a direct current.

Although the exemplary embodiments have been described, these embodiments have been presented by way of example only, and are not intended to limit the scope of the invention. Indeed, these novel embodiments can be carried out in a variety of other forms, and various omissions, substitutions and changes can be made within the scope not departing from the gist of the invention. These embodiments and modifications thereof fall within the scope and the gist of the invention and fall within the scope of the invention recited in the claims and their equivalents.

What is claimed is:

1. A switching power supply comprising:
a first inductor;
a first switching element that supplies a power supply voltage to the first inductor and allows a current to flow when the first switching element is on;
a rectifying element that is connected in series to the first switching element, and allows a current of the first inductor to flow when the first switching element is turned off; and
a second inductor electromagnetically coupled to the first inductor, in which a potential to turn on the first switching element is induced when the current of the first inductor increases, a potential to turn off the first switching element is induced when the current of the first inductor decreases, and the induced potential is supplied to a control terminal of the first switching element,
wherein the rectifying element includes
a diode having a withstand voltage lower than that of the first switching element, and
a second switching element that is connected in series to a cathode of the diode and includes a control terminal connected to an anode of the diode.

2. The power supply of claim 1, wherein the diode has the withstand voltage lower than that of the second switching element.

3. The power supply of claim 1, wherein the second switching element is a normally-on element.

4. The power supply of claim 1, wherein the diode is a Schottky barrier diode.

5. The power supply of claim 1, wherein a period in which the first switching element is off is longer than a period in which the first switching element is on.

6. The power supply of claim 1, further comprising a constant current element connected in series to the first switching element.

7. The power supply of claim 6, wherein the rectifying element is connected in series to the first switching element through the constant current element.

8. The power supply of claim 6, wherein a voltage obtained by reducing the power supply voltage is outputted.

9. The power supply of claim 6, wherein the rectifying element is connected in series to the constant current element through the first switching element.

10. The power supply of claim 6, wherein a voltage obtained by raising the power supply voltage is outputted.

11. A luminaire comprising:
a switching power supply; and
an illumination load connected as a load circuit of the switching power supply,
wherein the switching power supply includes
a first inductor,
a first switching element that supplies a power supply voltage to the first inductor and allows a current to flow when the first switching element is on,
a rectifying element that is connected in series to the first switching element, and allows a current of the first inductor to flow when the first switching element is turned off, and
a second inductor electromagnetically coupled to the first inductor, in which a potential to turn on the first switching element is induced when the current of the first inductor increases, a potential to turn off the first switching element is induced when the current of the first inductor decreases, and the induced potential is supplied to a control terminal of the first switching element, and
wherein the rectifying element includes
a diode having a withstand voltage lower than that of the first switching element, and
a second switching element that is connected in series to a cathode of the diode and includes a control terminal connected to an anode of the diode.

12. The luminaire of claim 11, wherein the diode has the withstand voltage lower than that of the second switching element.

13. The luminaire of claim 11, wherein the second switching element is a normally-on element.

14. The luminaire of claim 11, wherein the diode is a Schottky barrier diode.

15. The luminaire of claim 11, wherein a period in which the first switching element is off is longer than a period in which the first switching element is on.

16. The luminaire of claim 11, further comprising a constant current element, connected in series to the first switching element.

17. The luminaire of claim 16, wherein the rectifying element is connected in series to the first switching element through the constant current element.

18. The luminaire of claim 16, wherein a voltage obtained by reducing the power supply voltage is outputted.

19. The luminaire of claim 16, wherein the rectifying element is connected in series to the constant current element through the first switching element.

20. The luminaire of claim 16, wherein a voltage obtained by raising the power supply voltage is outputted.

* * * * *